May 19, 1931. H. WEINRUB Re. 18,074

CONTROL FOR KNITTING MACHINES

Original Filed Jan. 7, 1930 2 Sheets-Sheet 1

INVENTOR
Harry Weinrub
BY
Schecht & Lotch
ATTORNEYS

May 19, 1931. H. WEINRUB Re. 18,074
CONTROL FOR KNITTING MACHINES
Original Filed Jan. 7, 1930 2 Sheets-Sheet 2
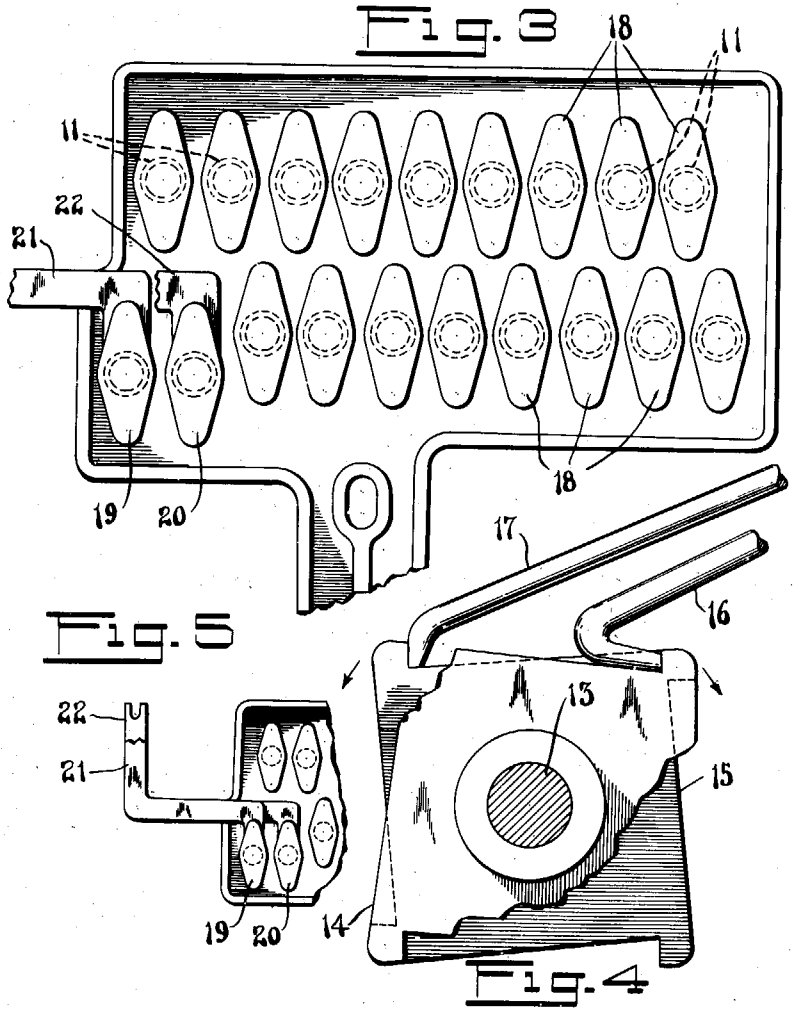
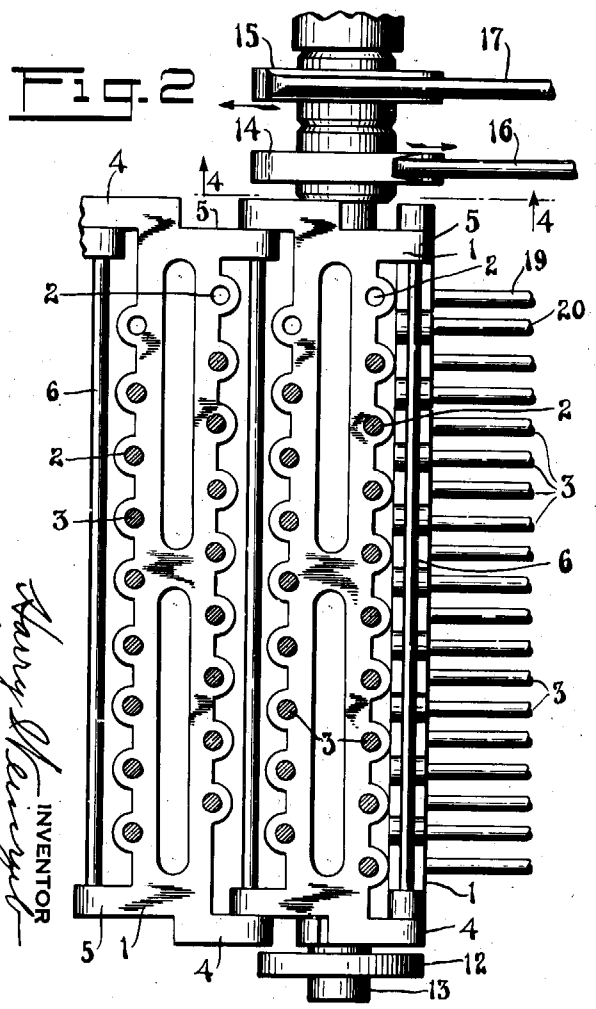
Harry Weinrub INVENTOR
BY Schuchts & Lotsch his ATTORNEYS Reissued May 19, 1931 Re. 18,074

UNITED STATES PATENT OFFICE

HARRY WEINRUB, OF NEW YORK, N. Y.

CONTROL FOR KNITTING MACHINES

Original No. 1,791,989, dated February 10, 1931, Serial No. 419,032, filed January 7, 1930. Application for reissue filed March 9, 1931. Serial No. 521,321.

My invention relates to the control bar links carrying the pins which in turn control the actual positioning of the bars of a knitting machine and produce the desired knitted pattern and it is my object to produce control means by the use of which more elaborate and complicated patterns may be produced by greatly increasing the number of control pins in each bar link and to reduce the number of bar links required to produce a given pattern by one half.

The type of knitting machine to which my invention is applied is that of the crochet or chain stitch type. This type of machine employs a plurality of bars carrying yarn guides which are moved longitudinally to bring the weft yarns into proper position with respect to the needles on the needle bar to knit or crochet the desired pattern. The means employed for moving these yarn guide bars longitudinally endwise, is similar to that disclosed in U. S. Letters Patent No. 512,059, dated January 2, 1894, to C. B. Sander and more particularly shown in Figs. 2 and 2*a* of the drawings thereof by the reference characters N, $N^1$, O, $O^1$, $O^2$, $O^3$, $O^4$, $O^5$, and my principal object is to provide such mechanism with means whereby the direction of travel of the chain of pin links may be reversed at predetermined points so that the most complicated patterns may be produced with a comparatively short chain of pin links.

Heretofore it has been the practice to use a bar link having one row of a maximum of ten pins. My improved bar link has two or more rows of pins which are staggered, with a corresponding increase of the number of bars in the knitting machine proper, so that my bar link may have as many as nineteen pins thus producing more elaborate and complicated patterns in the knitted goods.

Heretofore it has been customary to use as many bar links as there were rows of stitches in the pattern. These patterns, in practice, are symmetrical on each side of a center line and this resulted in a duplication of the bar links so that the pins on one half of the number of bar links made one half of the pattern and the pins, in reverse arrangement on the other half of the number of bar links made the other half of the pattern, the chain of bar links always travelling in the same direction.

I set the pins in the bar links to knit one half of the pattern and when this has been knitted reverse the direction of travel of the chain of bar links so that the same pins will control the knitting of the other half of the pattern. This cuts the time of setting up the machine one half, requires but one half the number of bar links, minimizes the space required by the chain of bar links, which in knitting a complicated pattern, sometimes reaches from the floor to the ceiling, as well as reduces the weight and impact of the reciprocating chain of bar links so that less power is required and the wear and tear on the knitting machine is reduced.

In the drawings—

Fig. 2 is a top view of the structure of Fig. 1 on the line 2—2 thereof;

Fig. 3 is a view of the structure of Fig. 1 on the line 3—3 thereof;

Fig. 4 is a detail view of one form of reversing mechanism; and

Fig. 5 is another detail view of the reversing mechanism.

Figure 1:
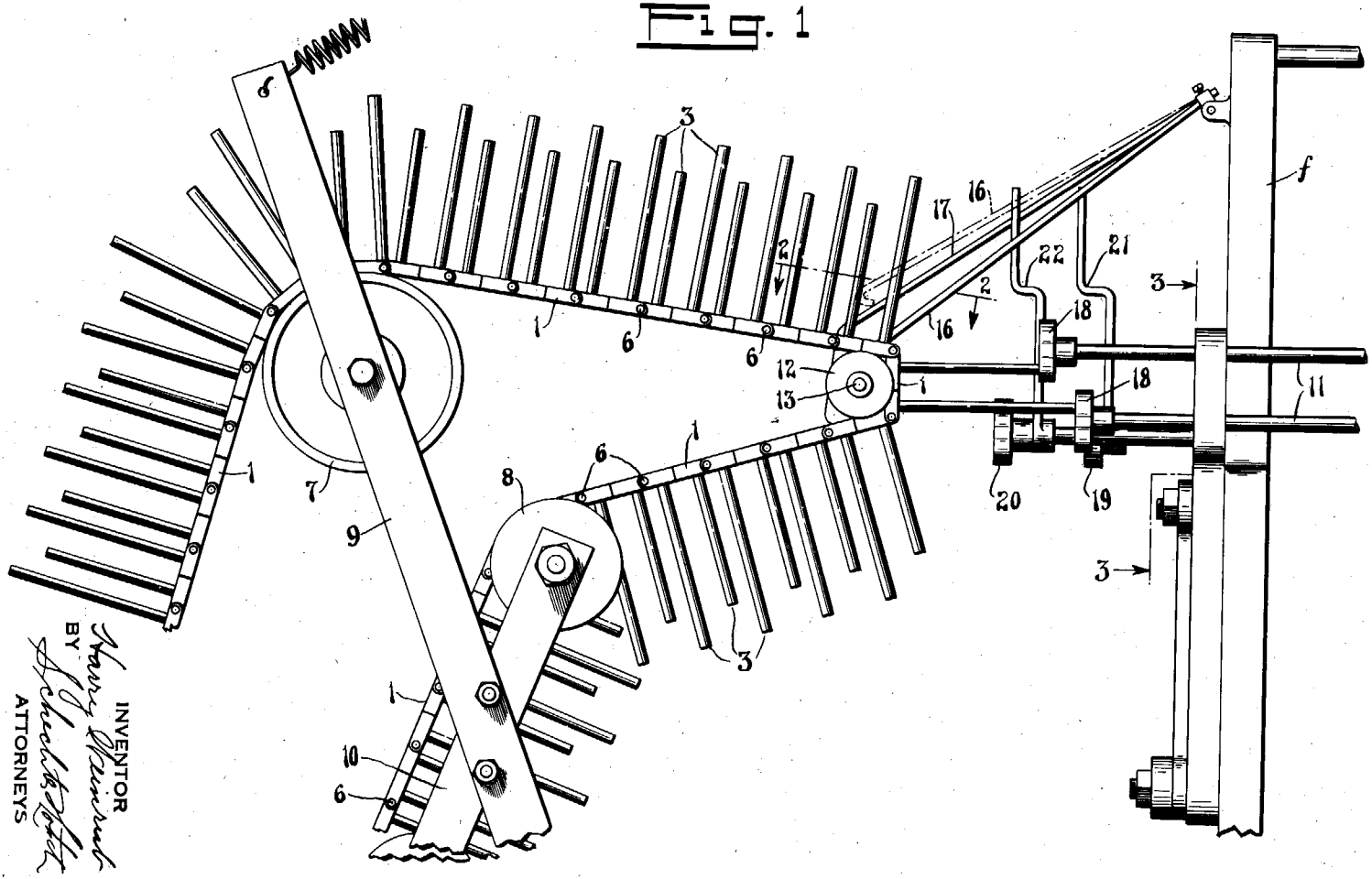
Fig. 1 is a side view of my improved control device.

My control device can be applied to any standard knitting machine of the type having bars controlling the position of the yarn guides carried thereby and thus the actual knitting of the pattern, which bars are moved by pins on a link forming part of a chain of bars, which chain is intermittently reciprocated and driven against the ends of the bars in the knitting machine to move the yarn guides into proper position for each loop.

One of these control devices is provided for each end of a knitting machine and I have illustrated but one of these as they are duplicates so far as mechanism and principle of operation is concerned, the only difference being in the length of the pins, which varies with each pattern.

The control device consists of a chain of bar links 1 each provided with two or more staggered rows of holes 2, each hole being adapted to receive and retain a pin 3.

At each end of each link 1 are two ears 4 and 5 which intermesh on adjoining links, being held together by a pin 6 so that an endless chain is formed. This chain of link bars is hung on rollers 7 and 8 mounted on the usual frame bars 9 and 10 which are given a reciprocating movement to drive them against and away from the bars in the knitting machine proper. A feed roller 12 is mounted on a shaft 13 in line with the bars 11 on the knitting machine. This shaft 13 also carries a pair of ratchets 14 and 15, the teeth of which are opposed.

Reverse movement of the pin chain 1 is effected by the slidable bar 19 carrying tripper arm 21 and slidable bar 20 carrying tripper arm 22, said bars being devoid of yarn guides. Two pawl arms 16 and 17 are hinged to the frame *f* of the knitting machine and extend downward in an inclined position to cooperate with the tripper arms 21 and 22 respectively whereby the pawl arms are raised and lowered to engage and disengage the ratchet wheels 14 and 15 as the bars 19 and 20 are moved in or out by pins on the chain. This movement is accomplished by the tripper arms 21 and 22 sliding along the inclined arms 16 and 17, thus raising the free ends of the latter out of engagement with the ratchet wheels or lowering same into engagement therewith, as the case may be.

The ratchet wheels 14 and 15 with their teeth set in opposite directions, as shown in Fig. 4, are secured to the shaft 13 which carries the chain of pin links. The pawl arm 16 co-acts with the ratchet wheel 14 and the pawl arm 17 co-acts with the ratchet wheel 15.

When the pawl arm 16 is in operative engagement with the ratchet wheel 14, and the chain and its support are swung toward and away from the frame of the knitting machine so as to position the yarn guide bars, the shaft 13 will revolve to the right, (Fig. 4), carrying the chain one link on each reciprocation, the pawl arm 17 during this time being raised out of operative engagement with ratchet wheel 15. When the pawl arm 16 is raised out of engagement with ratchet wheel 14 by tripper arm 21, the pawl arm 17 is lowered to engage the ratchet wheel 15 thus causing the chain to travel to the left on the reciprocation of the carrier and chain, as shown in Fig. 4.

I prefer to mount the control bars 19 and 20 in a slightly off-set position as shown in Fig. 3, so as not to interfere with the yarn guide bars 11.

To effect reversal of movement at any predetermined point in the knitting or crocheting, it is only necessary to insert a reverse control pin 3*a*, the latter being of the same type as the pins 3, in the proper link of the chain at each end of the knitting machine so that one pawl arm will be lifted as the other is lowered. Reverse movement of the chain may occur at any predetermined point during the knitting or crocheting operation, said reverse movement occurring when the reverse pin 3*a*, contacts with either of the control bars 19 and 20.

The frame 9 reciprocates to and from the knitting machine in the usual manner and each time it reciprocates the pins on the bar link opposite the bars will move the bars 11 carrying the yarn guides into proper position for the next row of stitches, this operation taking place alternately at each end of the knitting machine in the well known manner.

A chain of bar links and pins are set up to knit one half of a pattern and on the last bar link of the half pattern a reversing pin is mounted to reverse the position of the drive rods 16 and 17 so that the chain of links will travel in the opposite direction and knit the other half of the pattern.

It is obvious that other reversing mechanisms may be substituted for that shown without departing from the scope of my invention, which resides essentially in providing the bar links with a plurality of staggered rows of pins so that a greater number of bars may be operated at one time and reversing the direction of travel of the chain of bar links so that but one half the usual number will be required.

Having now described my invention, what I claim, and desire to secure by Letters Patent, is:

1. In a warp knitting machine of the chain stitch type, movable weft yarn guides, pattern mechanism formed of a plurality of bar members, the length of said pattern mechanism representing substantially one-half of a symmetrical design in the finished fabric, a plurality of staggered pins carried by each of said bar members to actuate said guides to control the throw of the weft yarn, means to actuate the pattern mechanism in one direction throughout its length to produce one-half of the design, and means for reversing the movement of the pattern mechanism throughout its length to complete the design.

2. In a warp knitting machine of the chain stitch type, movable weft yarn guides, pattern mechanism formed of a plurality of bar members, the length of said pattern mechanism representing a portion less than the whole of a symmetrical design in the finished fabric, a plurality of staggered pins carried by each of said bar members to actuate said guides to control the throw of the weft yarn, means to actuate the pattern mechanism in one direction to produce said portion of the design, and means for reversing the movement of the pattern mechanism to complete the design.

3. In a pattern mechanism for knitting machines, a pair of bar link chains, one at each end of the knitting machine, each bar link of said chains being provided with holes to receive removable pins, control bars, actuation of which positions yarn guides to control the pattern, means for feeding said bar links successively to a position opposite said control bars, means for reciprocating said bar link chains alternatively to cause said pins to engage and move said control bars, means to reverse the direction of feed of said bar links, and removable pins carried by said bar links to actuate said reversing means.

4. In a pattern mechanism for knitting machines, a pair of bar link chains, one at each end of the knitting machine, each bar link of said chains being provided with holes to receive removable pins, control bars, actuation of which positions yarn guides to control the pattern, means for feeding said bar links successively to a position opposite said control bars, means for reciprocating said bar link chains alternatively to cause said pins to engage and move said control bars, means to reverse the direction of feed of said links, said reversing means comprising shafts, rotation of which moves said chains, a ratchet wheel mounted on each of said shafts to rotate the same in one direction, a second ratchet wheel mounted on each of said shafts to rotate the same in the opposite direction, pawl arms engaging said ratchet wheels to rotate the same, means for positioning said pawl arms to alternatively engage and release their respective ratchet wheels, and removable pins inserted in said bar links which, when inserted, actuate said positioning means to cause said ratchet wheels alternatively to rotate said shafts.

This specification signed this 7th day of March, 1931.

HARRY WEINRUB.